United States Patent
Verma et al.

(10) Patent No.: US 9,292,651 B2
(45) Date of Patent: Mar. 22, 2016

(54) SYSTEM FOR PARTITIONING INTEGRATED CIRCUIT DESIGN BASED ON TIMING SLACK

(71) Applicants: Chetan Verma, Noida (IN); Amit Kumar Dey, Noida (IN); Ashis Maitra, Bangalore (IN); Kulbhushan Misri, Gurgaon (IN); Amit Roy, Noida (IN); Harkaran Singh, Amritsar (IN); Vijay Tayal, Noida (IN)

(72) Inventors: Chetan Verma, Noida (IN); Amit Kumar Dey, Noida (IN); Ashis Maitra, Bangalore (IN); Kulbhushan Misri, Gurgaon (IN); Amit Roy, Noida (IN); Harkaran Singh, Amritsar (IN); Vijay Tayal, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 121 days.

(21) Appl. No.: 14/195,827

(22) Filed: Mar. 3, 2014

(65) Prior Publication Data

US 2015/0248519 A1  Sep. 3, 2015

(51) Int. Cl.
*G06F 17/50* (2006.01)
(52) U.S. Cl.
CPC ........ *G06F 17/5081* (2013.01); *G06F 17/5072* (2013.01); *G06F 2217/84* (2013.01)

(58) Field of Classification Search
CPC ............ G06F 17/5031; G06F 17/5081; G06F 2217/84
USPC ................................. 716/108, 124–125, 132
See application file for complete search history.

(56) References Cited

U.S. PATENT DOCUMENTS

| | | | |
|---|---|---|---|
| 5,778,216 A | 7/1998 | Venkatesh | |
| 6,249,902 B1 | 6/2001 | Igusa et al. | |
| 6,480,991 B1 | 11/2002 | Cho et al. | |
| 8,365,113 B1* | 1/2013 | Bhardwaj | G06F 17/505 716/104 |
| 8,473,884 B2* | 6/2013 | Daede | G06F 17/5031 716/108 |
| 8,504,978 B1* | 8/2013 | Bhardwaj | G06F 17/5036 716/106 |
| 2004/0250226 A1* | 12/2004 | Lin | G06F 17/5031 716/124 |
| 2008/0307374 A1 | 12/2008 | Gregerson et al. | |

* cited by examiner

*Primary Examiner* — Nghia Doan
(74) *Attorney, Agent, or Firm* — Charles E. Bergere

(57) ABSTRACT

A method of physical design of an IC using an EDA tool includes identifying elements of the IC design that have excess positive timing slack. The excess timing slack elements are placed in a separate partition and then parameters of the characteristics of the excess timing slack elements are modified to reduce their excess timing slack, such as reducing the voltage supplied to the separate partition, thereby lowering power consumption of the IC design.

6 Claims, 5 Drawing Sheets

SYSTEM FOR PARTITIONING INTEGRATED CIRCUIT DESIGN BASED ON TIMING SLACK

BACKGROUND OF THE INVENTION

The present invention is directed to tools for designing integrated circuits and, more particularly, to a tool that analyzes timing slack of an integrated circuit design and partitions the design based on the timing slack.

Modern integrated circuits (ICs) are much too complex to be designed manually; instead, they are designed using electronic design automation (EDA) tools. Typically, design of an IC using EDA tools includes the steps of system specification, architectural design, functional and logic design, circuit design, physical design, and physical verification, among others. During the circuit design flow, register-transfer-level (RTL) abstraction is typically used in hardware description languages (HDLs) like Verilog and VHDL to create high-level representations of the IC. Designs for individual standard cells and their characteristics are selected from a standard cell library, which may include variants of different cells with different performance characteristics, power requirements and floor area, etc. An RTL description is defined in terms of registers that store signal values, and combinational logic that performs logical operations on the signal values. The RTL description is usually converted to a gate-level cell description (such as a netlist) in the synthesis process, which can then be used in the physical design process.

The physical design process typically starts with floor planning. During floor planning, the relative overall positions of items of the IC design are defined, including input/output (I/O) structures, memories, and data paths, as well as processor cores. The floor plan has a major influence on considerations of chip area and operational speed, including routing resources, and interconnection lengths, for example.

The physical design may be divided into partitions. Logical partitioning may be performed before floor planning, in RTL for example, to differentiate functional blocks based on their functionality and characteristics. Partitioning may also be performed or modified after preliminary floor planning. The partitioning may be soft, in which a soft partition is placed and routed and timing closed in conjunction with the rest of the sea of gates (SoG), or may be hard partitioning, in which blocks have physical boundaries (not necessarily contiguous) and are allocated initial timing budgets. These hard partitions are placed and routed, and their timing closed, independent of the rest of the SoG. This process can be iterative and may require the timing budgets for the hard partitions to be revised, iteratively.

After partitioning, the physical design process continues with placement and routing tools and clock tree synthesis to create a physical layout. Optimization of the physical design is performed at various stages, the subsequent stages then iterating to take account of the changes made. Wire length, module area, and variants of standard cells with greater or lesser performance can be substituted for the initial choices if it is found that the performance of the initial choice was insufficient or excessive. Timing budgets may be modified and, for example, timing slack in one element that has positive slack and is faster than its timing budget may be re-apportioned to another element in the same or a related data path and which has negative timing slack and failed to meet its timing budget.

After all opportunities for optimization of this kind have been exploited, it is often in fact the case that a large proportion of the data paths have excess positive timing slack. It is desirable to find a way of benefiting from the excess timing slack of those data paths.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION

Figure 1:
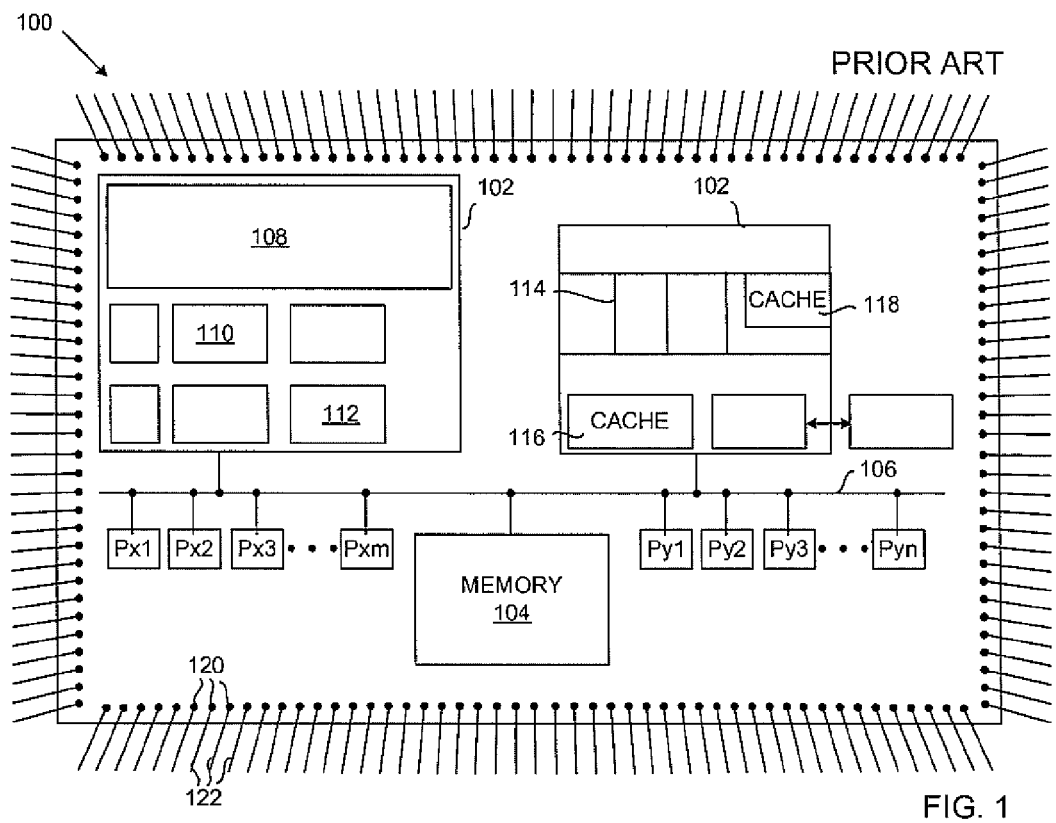
FIG. 1 is a schematic block diagram of a conventional integrated circuit (IC)

FIG. 1 illustrates an example of an integrated circuit (IC) 100 which may be designed by a method including a method of physical design in accordance with the present invention. The IC 100 has one or more processor cores such as 102 connected with memory 104 through core interconnects including a bus 106. The IC 100 includes an instruction unit 108, an execution unit 110, and an arithmetic logic unit 112, a cache controller 114, a clock controller 116, among other modules (not shown specifically). The IC 100 also has caches such as 116 and 118. Bond pads such as 120 are connected to input/output (I/O) pins (not shown) by bond wires such as 122. The IC 100 also includes peripherals Px1 to Pxm and Py1 to Pyn. The peripherals may include modules whose function may be communication, power management or built-in self-test (BIST) for example.

Figure 2:
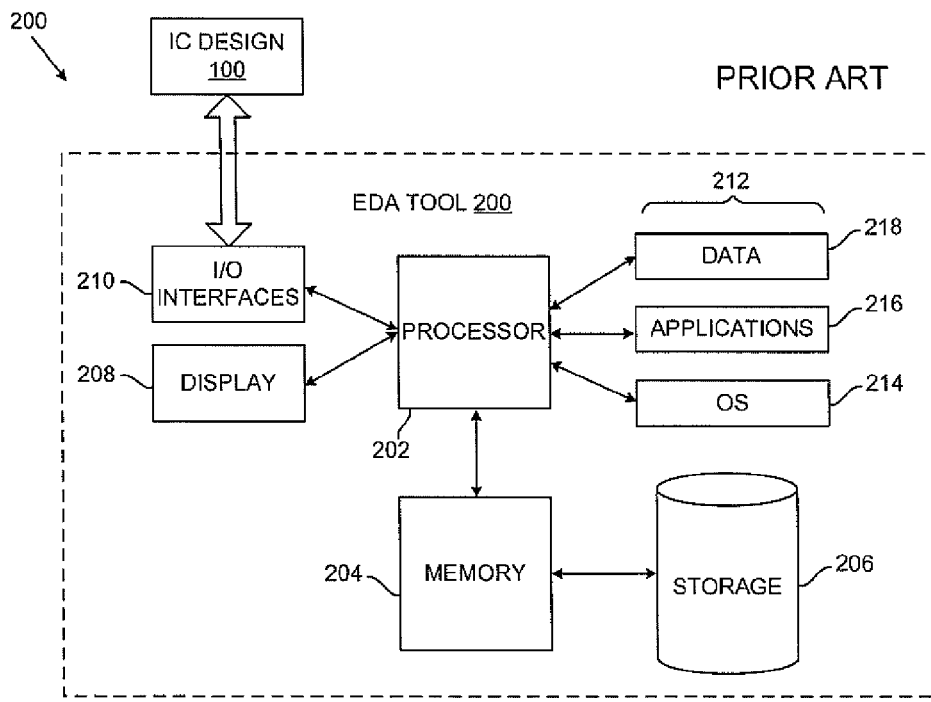
FIG. 2 is a schematic block diagram of an exemplary electronic design automation (EDA) tool for performing the methods of the present invention of physical design of an IC such as the IC of FIG. 1.

FIG. 2 is a schematic block diagram of an electronic design automation (EDA) tool 200 in accordance with an embodiment of the present invention for use in performing methods of design of an IC, such as the IC 100. The EDA tool 200 includes a processor 202 coupled to a memory 204 and additional memory or storage 206 coupled to the memory 204. The EDA tool 200 also includes a display device 208, input/ output interfaces 210, and software 212. The software 212 includes operating system software 214, applications programs 216, and data 218. The applications programs 216 can include, among other things, modules for use in architectural design, functional and logic design, circuit design, physical design, and verification. The data 218 can include an architectural design, a functional and logic design, a circuit design, a physical design, a modified or corrected physical design, and a library of standard cells and other components, with variants having different characteristics. The EDA tool 200 generally is known in the art except for the software used to implement the method of physical design of the IC. When software or a program is executing on the processor 202, the processor becomes a "means-for" performing the steps or instructions of the software or application code running on the processor 202. That is, for different instructions and different data associated with the instructions, the internal circuitry of the processor 202 takes on different states due to different register values, and so on, as is known by those of skill in the art. Thus, any means-for structures described herein relate to the processor 202 as it performs the steps of the methods disclosed herein.

Figure 3:
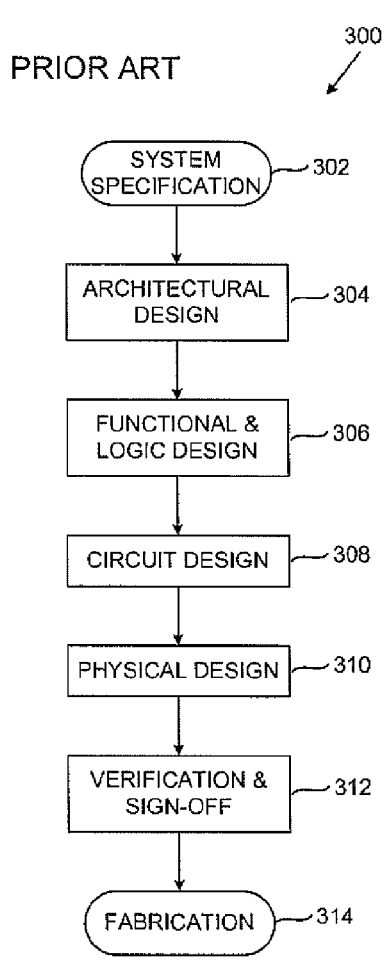
FIG. 3 is a flow chart of a conventional method of designing an IC, which may include the methods of the present invention of physical design of an IC such as the IC of FIG. 1.

FIG. 3 illustrates a method 300 of design of an IC, which may be performed using the EDA tool 200, starting from a system specification 302, and including architectural design 304, functional and logic design 306, circuit design 308, physical design 310, and verification 312 and sign-off, and is completed by fabrication 314 and testing.

Figure 4:
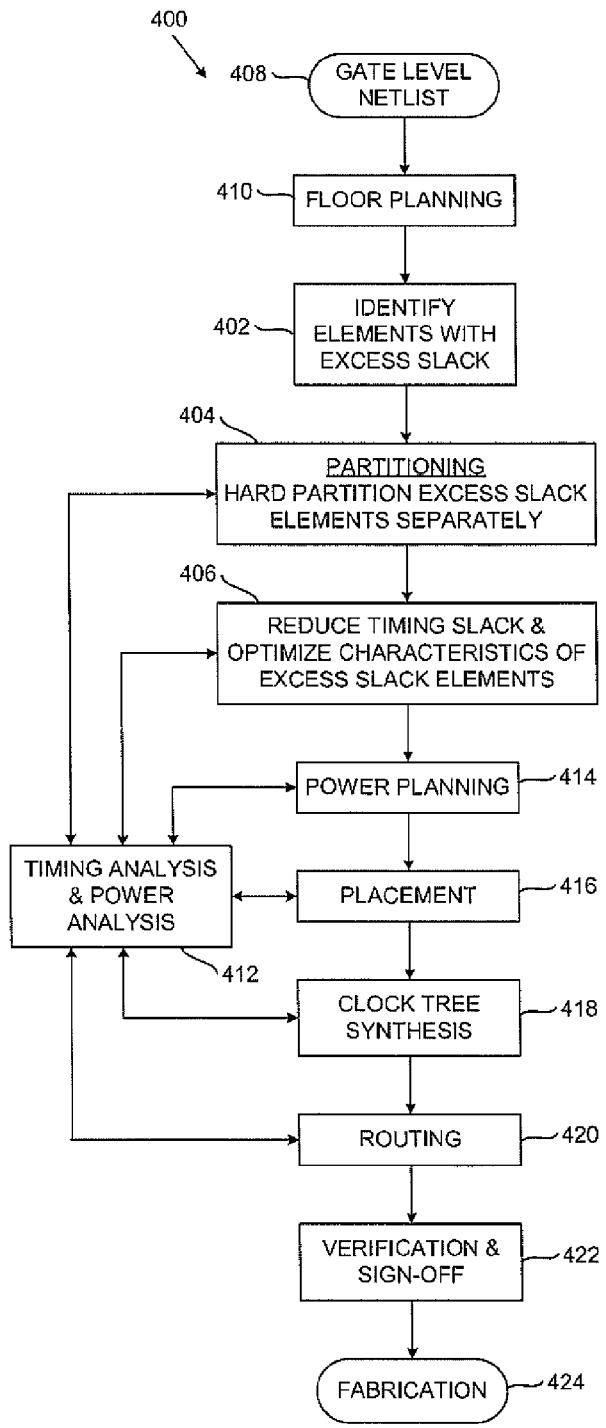
FIG. 4 is a flow chart of a method of physical design of an IC such as the IC of FIG. 1 in accordance with an embodiment of the invention, given by way of example.

FIG. 4 illustrates a method 400 in accordance with an embodiment of the invention of physical design 310 of an IC using an EDA tool such as 200 which includes a processor 202 and a memory 204, 206 coupled to the processor 202, wherein a circuit design of the IC is stored in the memory 204, 206. The method 400 comprises identifying 402 elements of the circuit design that have excess positive timing slack. At 404, the excess timing slack elements are partitioned in at least one partition SBP separately from other elements of the circuit design. At 406 parameters of the characteristics of the excess timing slack elements are modified to reduce their excess timing slack while improving other parameters of their characteristics.

The embodiment of the invention also includes a non-transitory computer-readable storage medium storing instructions for an EDA tool such as 200 that includes a processor 202 and a memory 204, 206 coupled to the processor, which when the instructions are executed cause the EDA tool to perform the method 400 of physical design of an IC.

The excess timing slack elements may be identified at 402 as a function of timing criteria relative to an operating frequency of the processor 102 and to their functional timing requirements.

The partition SBP at 404 may be a hard partition having physical boundaries and that is placed and routed independently of the rest of the circuit design.

At 406, modifying parameters of the characteristics of the excess timing slack elements may include reducing a supply voltage to their partition and reducing their power consumption. The excess timing slack elements may be partitioned in two or more partitions SBP1 and SBP2, and modifying parameters of the characteristics of the excess timing slack elements may include reducing by a different amount the supply voltages to their respective partitions SBP1 and SBP2.

Alternatively, or in addition, at 406, modifying parameters of the characteristics of the excess timing slack elements may include reducing their drive strength thereby reducing their chip area.

In more detail, as shown in FIG. 4, the method 400 starts at 408 with a gate level netlist that is the result of the synthesis process in the circuit design 308. The physical design starts with floor planning 410, in which structures, including I/O structures, and data paths are positioned overall relative to each other and space is allocated to them.

Partitioning 404 the elements of the IC may be performed in two or more stages and a preliminary stage of partitioning may even be performed during circuit design 308. In this example, identifying 402 elements of the circuit design that have excess positive timing slack begins with an initial step of identifying elements whose minimum operating frequency is less than a defined fraction of the clock frequency of the processor core 102, such as half the clock frequency, for example, and put in one or more hard partitions SBP during preliminary partitioning in the gate level netlist at 408. Timing analysis and power analysis 412 enables the selection of elements with excess timing slack to be refined with iterations as desired. The revised selection of excess timing slack elements then modifies the hard partitions SBP at 404.

Figure 5:
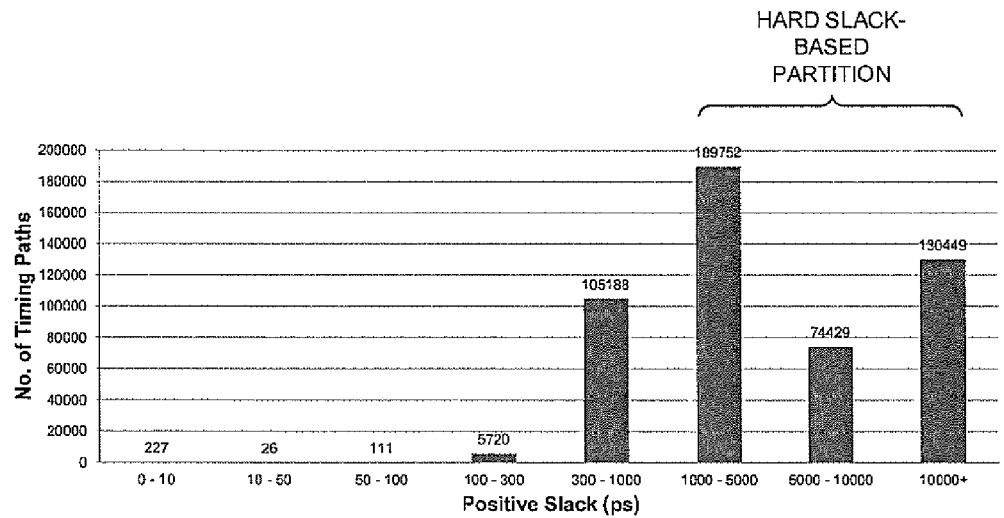
FIG. 5 is a graph of the distribution of timing slack in an IC such as the IC of FIG. 1 after conventional physical design, and indicating criteria for partitioning of the IC in a method of physical design in accordance with a first embodiment of the invention, given by way of example.

FIG. 5 illustrates an example of distribution of numbers of data paths having different values of positive timing slack, after all conventional techniques for optimizing the physical design have been performed, such as modifying wire length, module area, substituting variants of standard cells with greater or lesser performance and reapportioning timing budgets have been performed. In this example, it was found that 95% of the data path elements had excess positive timing slack. In the IC 600 of FIG. 6, it was found that about 48% of the elements could be put in a single hard slack-based partition SBP, which allows an overall power or area reduction without compromising on the performance of the design. The partition SBP groups together the different excess timing slack elements, and parameters of their characteristics can then be modified together at 406 to reduce their excess timing slack while improving other parameters of their characteristics. As shown, the partition SBP of the excess slack elements has physical boundaries but the elements are not necessarily physically contiguous.

Typically, it is found that most of the excess timing slack elements are peripherals. The timing of the processor cores such as 102 is typically critical and is the fastest available with the technology used to manufacture the IC. The peripherals Px1 to Pxm and Py1 to Pyn are then made using the same technology, but their timing is typically much less critical in use than that of the processor cores, and they exhibit timing slack.

In this embodiment of the invention, the parameter that is modified at 406 to reduce the excess timing slack is the power supply voltage, in order to improve the IC power consumption. The reduction of supply voltage chosen is 10%, although it will be appreciated that other reductions may be chosen as a function of the IC design depending upon the selection of the elements shown in FIG. 5. This selection is user driven. For example, the user might choose to start with a criterion of 300 ps of positive slack (a purely indicative number), or might choose to start with a criterion of 1000 ps of positive slack; all the elements which have greater than this slack threshold are then put into the hard partition SBP. It may be noted that since the hard partition SBP thus created based on excess slack elements will get reduced voltage, voltage level shifting cells may be required to enable a proper interface between this hard partition and the rest of the logic. It will be appreciated that the hard partition SBP thus created using the elements with excess slack would have a clock tree which is independently synthesized and laid out in accordance with this partition elements and timing relationships therein.

Figure 6:
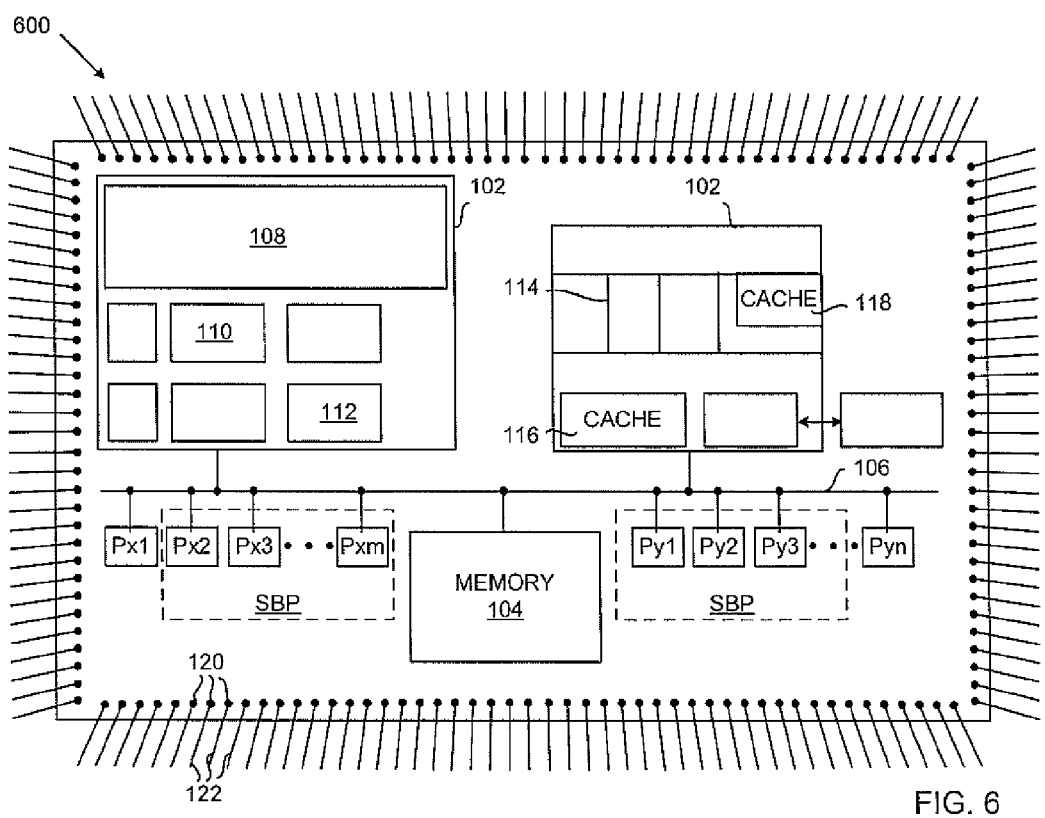
FIG. 6 is a schematic block diagram of partitioning of an IC such as the IC of FIG. 1 in the method of physical design in accordance with the first embodiment of the invention.
Figure 7:
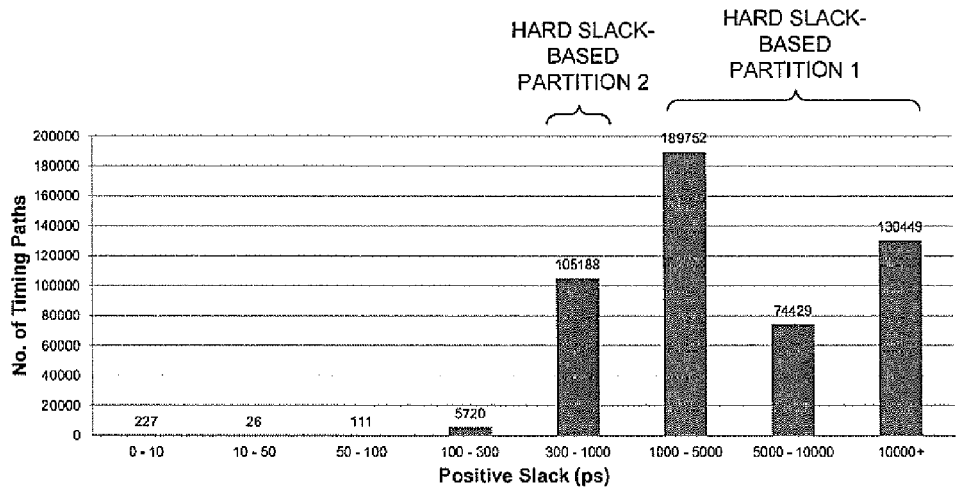
FIG. 7 is a graph of the distribution of timing slack in an IC such as the IC of FIG. 1 after conventional physical design, and indicating criteria for partitioning of the IC in a method of physical design in accordance with a second embodiment of the invention, given by way of example.
Figure 8:
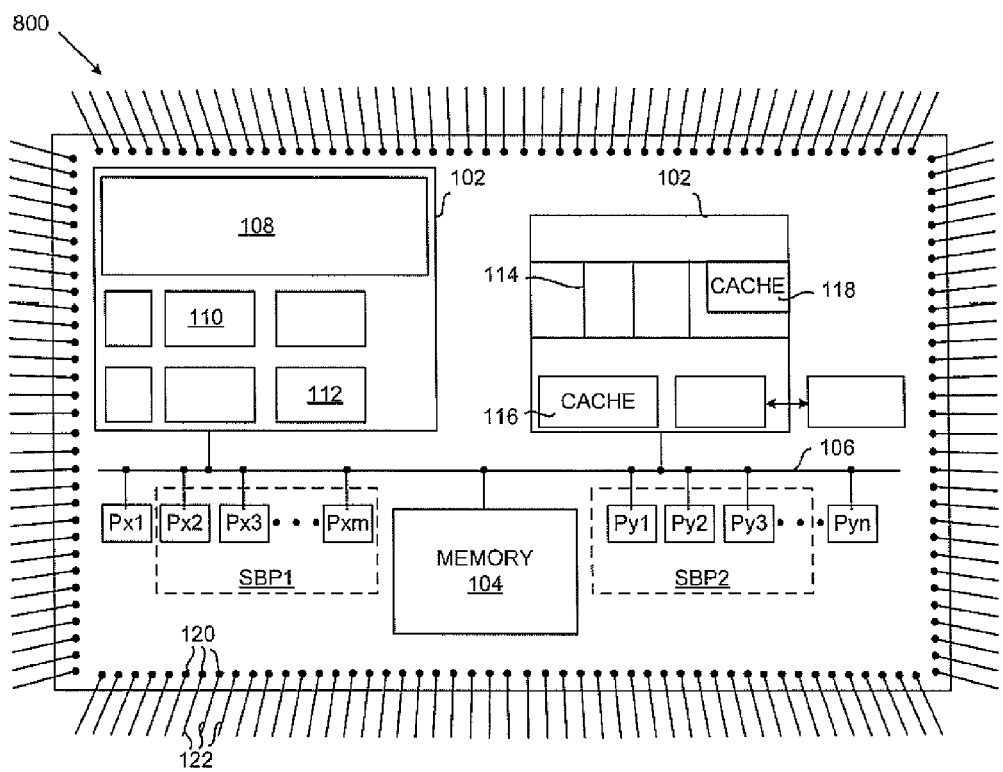
FIG. 8 is a schematic block diagram of partitioning of an IC such as the IC of FIG. 1 in the method of physical design in accordance with the second embodiment of the invention.

In the example of FIGS. 5 and 6, the data path elements that had excess timing slack are put in a single hard partition SBP. In the example of FIGS. 7 and 8, the data path elements that have excess timing slack are put in two different hard partitions SBP1 and SBP2. The data path elements that have excess timing slack greater than a threshold are put in a first hard partition SBP1 and the excess timing slack is reduced by a greater amount than the data path elements that have excess timing slack SBP2 less than the threshold, which are put in a second hard partition. A reduction of supply voltage of 10% is chosen for the first partition SBP1, whereas a reduction of supply voltage of only 5% is chosen for the second partition SBP2. The percentage reductions mentioned here are purely indicative in nature and are used for purposes of illustration.

In one example, the method of FIGS. 5 and 6 (Partition 1) gave a power saving greater than 5% for the entire sea of gates (SoG) of the IC. The method of FIGS. 7 and 8 (Partitions 1 and 2) gave a power saving greater than 8.3% for the entire sea of gates (SoG) of the data paths of the IC 100.

FIGS. 5 to 8 illustrate an example with supply voltage reduction of 10% for Partition SBP1, and 5% for Partition SBP2. In general, the supply voltage reduction (or other modification of parameters of the characteristics of the excess timing slack elements) is sufficient for the other parameters of their characteristics to obtain maximum benefit without reducing the timing slack to levels which are insufficient. The resulting timing slack levels are subject to checks from timing analysis 412 in addition.

In general, a condition for avoiding reducing the timing slack in a data path element having n instances to levels which are insufficient can be expressed as:

$$\sum_{1}^{n}[(D+\Delta D)+(T_S+\Delta T_S)+(C_Q+\Delta C_Q)] \le T_{clk}$$

where D is the delay of each instance in the data path, $T_S$ is the set-up time of the flip-flop or other gate of the instance, $C_Q$ is the delay from the clock edge to the corresponding change in the output of the instance, $\Delta$ represents the change made by the modification 406 of parameters of the characteristics of the excess timing slack elements because of the reduction of supply voltage and $T_{clk}$ is the clock period for the data path.

The physical design process continues with power planning 414, placement 416, clock tree synthesis 418, routing 420, verification and sign-off 422 to create a physical layout, before fabrication 424, initially of samples, and testing.

In a second embodiment of the invention, the parameter that is modified at 406 to reduce the excess timing slack is chosen in order to reduce the die area occupied by the excess timing slack elements. In one example of the second embodiment of the invention, the parameter that is modified at 406 is the drive strength of the elements. Reducing the drive strength of gates can be obtained by choosing smaller variants of standard cells for the gates, which has as consequence a reduction of the excess timing slack of the data path and resulting in reduction of the cell area. It is to be noted that even after the drive strength reduction, the available timing slack on these elements is sufficient to meet the performance.

In another example of the second embodiment of the invention, the area for the hard partition SBP containing excess slack elements can also be reduced by using different flavor library cells that are smaller in size and have lesser performance as compared to the rest of the logic that does not have excess slack. The loss in performance in these smaller flavor cells is compensated by the excess slack available in the timing paths of these excess slack elements. Thus, the use of these low height, smaller cells enable area reduction without any loss in performance.

Figure 9:
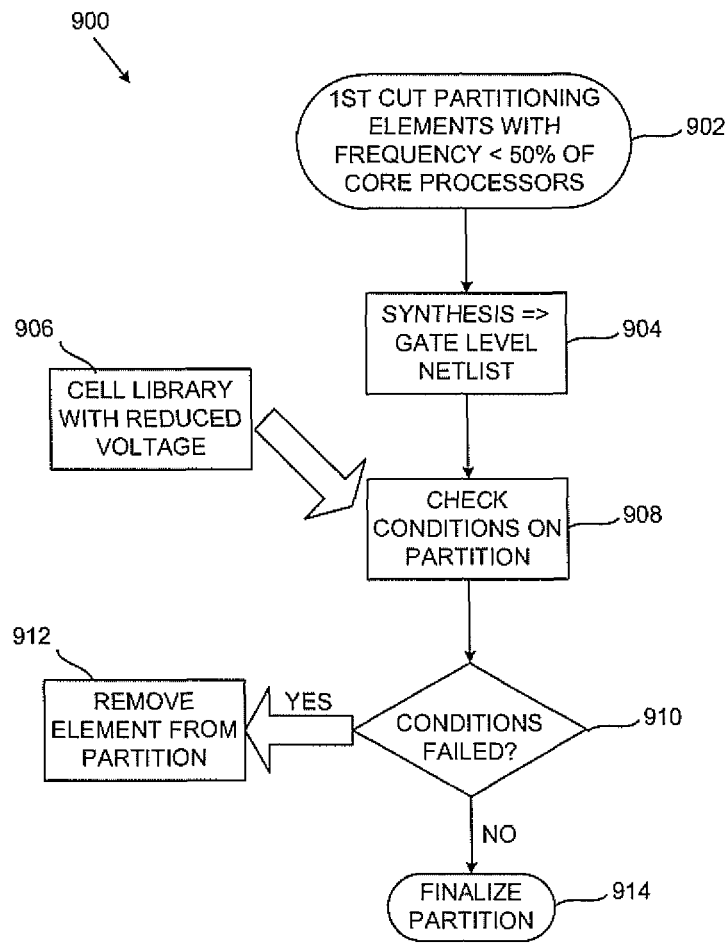
FIG. 9 is a flow chart illustrating a detail of the method of FIG. 4 in accordance with an embodiment of the invention.

FIG. 9 illustrates in more detail steps 900 in the method 400 shown in FIG. 4. At 902, a first cut is made for the partitioning, in this example by including in the partition SBP those elements whose operating frequency requirement is less than a pre-defined criterion, in this example 50% of the operating frequency of the processor cores 102. At 904, the design synthesis is converted to a gate-level netlist. For the excess timing slack elements included in the partition SBP, standard cells are used from a reduced voltage cell library 906. The conditions of the elements are checked at 908. If at 910, any excess timing slack elements do not meet the performance conditions, they are removed from the partition SBP at 912. The partition is finalized with the remaining excess timing slack elements at 914.

The invention may be implemented at least partially in a non-transitory machine-readable medium containing a computer program for running on a computer system, the program at least including code portions for performing steps of a method according to the invention when run on a programmable apparatus, such as a computer system or enabling a programmable apparatus to perform functions of a device or system according to the invention.

The computer program may be stored internally on computer readable storage medium or transmitted to the computer system via a computer readable transmission medium. All or some of the computer program may be provided on non-transitory computer-readable media permanently, removably or remotely coupled to an information processing system. The computer-readable media may include, for example and without limitation, any number of the following: magnetic storage media including disk and tape storage media; optical storage media such as compact disk media and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM and so on; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented that achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an" The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of physical design of an integrated circuit (IC) using an electronic design automation (EDA) tool, wherein the EDA tool includes a processor and a memory coupled to the processor, wherein a circuit design of the IC is stored in the memory, the method comprising:

analyzing the circuit design stored in the memory with the processor to identify elements of the circuit design that have excess positive timing slack;

creating a timing slack partition, using the processor, and placing the identified elements in the timing slack partition such that the identified elements are separated from other elements of the circuit design, wherein the timing slack partition is a hard partition having physical boundaries and is placed and routed independent of the rest of the circuit design;

modifying parameters of characteristics of the identified elements to reduce their excess timing slack; and saving circuit design with the timing slack partition and modified parameters in the memory as a revised circuit design.

2. The method of claim 1, wherein the excess timing slack elements are identified as a function of timing criteria relative to an operating frequency of the circuit design and their functional timing requirements.

3. The method of claim 1, wherein modifying parameters of the characteristics of the excess timing slack elements includes reducing a supply voltage to the timing slack partition.

4. The method of claim 3, wherein creating the timing slack partition comprises creating at least two timing slack partitions and placing the excess timing slack identified elements in the at least two partitions, and modifying parameters of the characteristics of the excess timing slack identified elements includes reducing by a different amount the supply voltages to the at least two partitions.

5. The method of claim 1, wherein modifying parameters of the characteristics of the excess timing slack identified elements includes reducing their drive strengths.

6. The method of claim 1, wherein modifying parameters of the characteristics of the excess timing slack identified elements includes reducing an area of the circuit they occupy.

* * * * *